United States Patent [19]

Tsubokura et al.

[11] Patent Number: 4,590,232

[45] Date of Patent: May 20, 1986

[54] HEAT-RESISTANT CPVC RESIN COMPOSITION

[75] Inventors: Yoshihisa Tsubokura, Ibaraki; Sumio Yamamoto; Eiji Aoishi, both of Settsu; Tamio Fujita, Akashi, all of Japan

[73] Assignee: Kanegafuchi Kagaku Kogyo Kabushiki Kaisha, Osaka, Japan

[21] Appl. No.: 709,369

[22] Filed: Mar. 11, 1985

Related U.S. Application Data

[63] Continuation of Ser. No. 486,084, Apr. 18, 1983, abandoned.

[30] Foreign Application Priority Data

Apr. 22, 1982 [JP] Japan ................................. 57-68494

[51] Int. Cl.$^4$ ....................... C08L 27/24; C08L 25/14
[52] U.S. Cl. .................................... 524/178; 524/179; 524/180; 524/523; 525/192; 525/227
[58] Field of Search ................. 525/192, 227; 524/178

[56] References Cited

U.S. PATENT DOCUMENTS

| 3,660,538 | 5/1972 | Matsumiya | 525/227 |
| 4,304,884 | 12/1981 | Okamoto | 525/230 |
| 4,371,666 | 2/1983 | Bourland | 525/207 |

FOREIGN PATENT DOCUMENTS

| 2353561 | 5/1974 | Fed. Rep. of Germany | 525/192 |
| 1171205 | 11/1969 | United Kingdom | 525/192 |

OTHER PUBLICATIONS

Penn, "PVC Technology," 8/1966, pp. 148–167.
Polymer Additives, Noyes, 1972, pp. 159 and 162.

*Primary Examiner*—Carman J. Seccuro
*Attorney, Agent, or Firm*—Armstrong, Nikaido, Marmelstein & Kubovcik

[57] ABSTRACT

A postchlorinated polyvinyl chloride composition having high processability for preparing molded products of outstanding properties comprises postchlorinated polyvinyl chloride and a copolymer of methyl methacrylate and a styrene monomer blended with the chloride. The composition has good thermal fluidity with good releasability from metal surface in processing and gives molded products of a high softening point and outstanding transparency.

4 Claims, No Drawings

HEAT-RESISTANT CPVC RESIN COMPOSITION

This application is a continuation of application Ser. No. 486,084, filed Apr. 18, 1983, now abandoned.

The present invention relates to a heat-resistant resin composition which is processable satisfactorily for giving shaped articles of high transparency.

Postchlorinated polyvinyl chloride (hereinafter referred to as "CPVC") is known as a useful industrial material because the resin has a higher softening point and higher rigidity than usual polyvinyl chloride. CPVC is a useful industrial material also in that the resin, like usual polyvinyl chloride, can be molded, shaped or otherwise processed by the same apparatus as used for processing usual polyvinyl chloride.

CPVC nevertheless has drawbacks; it is not shapable with high productivity and gives shaped articles of poor surface smoothness because it is low in thermal fluidity, while difficulties are encountered in producing highly transparent shaped articles from the resin.

These drawbacks of CPVC are attributable to the fact that the thermal fluidity temperature of the resin is very close to the thermal decomposition temperature thereof. Thus, before it is heated to a temperature sufficient for melting, the polymer starts to thermally decompose to undergo a marked color change or evolve hydrogen chloride gas, so that for shaping, the polymer is forced to flow at a slightly lower temperature. This results in reduced productivity and a shaped product of poor appearance (as with a rugged rough surface or lack of transparency).

Such drawbacks can be remedied by admixing with CPVC a substance which lowers the melting point to render the resin thermally flowable smoothly at a level below the thermal decomposition temperature. Based on this concept, it has been proposed to improve the thermal fluidity of CPVC by adding various substances thereto.

For example, U.S. Pat. No. 3,169,935 discloses a method of giving improved processability to CPVC with use of chlorinated paraffin, but this method is not desirable since the paraffin greatly reduces the inherent softening point of CPVC. U.S. Pat. No. 3,541,185 discloses a method of improving the thermal fluidity by incorporating MBS (methyl methacrylate-butadiene-styrene copolymer) and EVA (ethylenevinyl acetate copolymer) into CPVC. However, this method has the drawback that the softening point of shaped product lowers as the amount of EVA added increases and the serious drawback of failing to give transparent shaped articles.

It is desired that the substances for improving the processability of CPVC have such properties that they are uniformly miscible with CPVC and act to lower the melting point of CPVC but not to lower the softening point thereof. As substances having such properties, polymers compatible with CPVC appear to be suitable. From this viewpoint, Published Examined Japanese Patent Application No. 35177/1970 proposes to blend a methyl methacrylate polymer with CPVC. This method is effective for affording shaped articles of improved surface smoothness without lowering the softening temperature of CPVC. This method, however, has the drawback that the mixture exhibits decreasing lubricity on metal surfaces with an increase in the proportion of the methyl methacrylate polymer, such that when having a blending ratio required for giving high transparency, the mixture becomes tacky and difficult to shape by a long period of continuous operation.

An object of the present invention is to provide a composition which is easy to mold or shape for preparing a shaped product high transparency and high softening point.

We have carried out research on the miscibility of various blendable polymers with CPVC and found that when a copolymer of methyl methacrylate and a small amount of a styrene monomer is blended with CPVC, the resulting mixture exhibits unique properties.

The present invention provides a novel heat-resistant resin composition which has not only improved fluidity over CPVC but also transparency exceedingly superior to the inherent transparency of CPVC and a softening point equivalent to or higher than that of CPVC, the resin composition further having no tackiness on metal surfaces so as to be easily releasable from rolls.

Stated more specifically, the present invention provides a heat-resistant resin composition having good processability for producing shaped products of high transparency, characterized in that it comprises CPVC and a copolymer of methyl methacrylate and a styrene monomer.

The present invention will be described below in greater detail.

The CPVC to be used in this invention is obtained by chlorinating polyvinyl chloride which is prepared by a usual polymerization process, such as suspension polymerization, bulk polymerization, emulsion polymerization or the like. While the chlorination can be carried out by any of the aqueous suspension photochlorination process, dry-phase photochlorination process in fluid bed, chlorination process wherein a radical producing substance is used, etc., it is perferred that the resulting product, i.e., CPVC, have a chlorine content of 60 to 69% by weight and a specific viscosity ($\eta$sp. C=4 g/l, nitrobenzene, 30° C.) of 0.15 to 0.35. If the chlorine content is less than 60% by weight, the resulting heat-resistant resin composition has difficulty in retaining a satisfactory softening point and in obtaining satisfactory transparency. With more than 69% by weight of chlorine present, the composition has reduced thermal stability, is prone to thermal decomposition and undergoes a color change to dark reddish brown when rendered thermally flowable, giving a shaped product of poor appearance. When the specific viscosity is below 0.15, the composition, although having high thermal fluidity, is liable to produce a brittle shaped product having low impact resistance, whereas if it is over 0.35, it becomes difficult to obtain a shaped product of high transparency.

The copolymer of methyl methacrylate and a styrene monomer, when blended with CPVC according to the invention and further heated for molding or shaping, assures satisfactory thermal fluidity and gives the resulting product outstanding transparency and a high softening point. It is preferable that the composition of the present invention comprises 95 to 30% by weight of CPVC and 5 to 70% by weight of the copolymer. If the proportion of the copolymer is less than 5% by weight, the composition is inclined to fail to have sufficiently improved processability and to afford a shaped product which is still low in transparency. With more than 70% by weight of the copolymer present, the composition is inclined to reduce transparency of the product. To assure improved properties in respect of both processability and transparency, it is most desirable that the composition comprise 80 to 40% by weight of CPVC and 20 to 60% by weight of the copolymer.

It is also preferred that the copolymer to be blended with CPVC comprises 97 to 75% by weight of methyl methacrylate and 3 to 25% by weight of a styrene monomer. This composition of the copolymer is most preferable for improving the transparency of CPVC and also for assuring satisfactory overall properties in good balance in respect of processability, toughness, heat resistance, etc. With more than 97% by weight of methyl methacrylate present, the blend is inclined to become tacky on metal surfaces and gives a shaped product of slightly lower transparency, whereas with less than 75% by weight of methyl methacrylate present, the shaped product obtained is inclined to become brittle and to lose transparency. It appears that the styrene unit contained in the copolymer gives the copolymer good miscibility with CPVC and a refractive index most proximate to that of CPVC and decreases the tackiness on metal surfaces which is a drawback of methyl methacrylate hompolymer, particularly when it is contained in the copolymer in an amount of 3 to 25% by weight. Furthermore, the presence of the styrene copolymerized enables the product of the composition to have a softening point equivalent to or higher than that or CPVC.

As useful styrene monomers, α-methylstyrene and styrene are preferred.

Preferably the copolymer to be blended with CPVC has a specific viscosity ($\eta$sp. C=4 g/l, benzene, 30° C.) of 0.05 to 0.6. When having a specific viscosity of above 0.6, the copolymer is not so much effective for giving improved thermal fluidity to the composition. If the specific viscosity is below 0.05, the composition, although exhibiting improved thermal fluidity, is apt to give a brittle shaped product.

More preferably the specific viscosity is in the range of 0.1 to 0.3.

While the copolymer can be prepared by the usual emulsion polymerization process, the process can be practiced in any manner, for example, by placing the whole quantities of specified monomers into a reactor at first, or by placing in the monomers in divided portions continually, or by charging the monomers in divided portions of different compositions. The advantages of the invention can be assured insofar as the copolymer eventually obtained contains 97 to 75% by weight of methyl methacrylate most preferably.

The method of blending the copolymer with CPVC is not particularly limited but can be any of usual methods. A stabilizer, lubricant, and when desired, a coloring agent, etc. which are usually used for transparent polyvinyl chloride compositions are admixed with the blend composition, and the mixture is kneaded, and shaped or molded with heating. Use of impact modifiers for polyvinyl chloride gives high impact resistance to the heat-resistant resin composition of the invention. Especially suitable as such as modifier for affording improved impact resistance with out impairing high transparency is MBS (methyl methacrylate-butadiene-styrene copolymer). The contemplated object can be achieved when 5 to 15 parts by weight of MBS is used per 100 parts by weight of the present composition.

The present invention will be described with reference to the following examples.

EXAMPLE 1 and COMPARISON EXAMPLES a to c

The following materials were placed into a reactor equipped with a stirrer and a reflux condender.

| | |
|---|---|
| Deionized water | 300 parts by weight |
| Sodium salt of dioctylsulfosuccinate | 3.0 parts by weight |
| Sodium formaldehydesulfoxylate | 0.5 parts by weight |
| Disodium ethylenediaminetetraacetate | 0.01 parts by weight |
| Ferrous sulfate | 0.005 parts by weight |

After removing oxygen from the interior of the reactor, the atmosphere therein was replaced by nitrogen, and the mixture was heated to 60° C. with stirring. A mixture of 90 parts by weight of methyl methacrylate, 10 parts by weight of α-methylstyrene, 0.16 part by weight of tert-dodecylmercaptan and 0.4 part by weight of cumene hydroperoxide was added dropwise to the heated mixture. Five hours thereafter, the reaction mixture was cooled from outside to obtain a polymer latex. The latex was subjected to salting-out, followed by filtration, washing and drying to give a copolymer A in the form of a powder and having a specific viscosity of 0.18. Fifty parts by weight of the copolymer A and 50 parts by weight of CPVC having a chlorine content of 65% by weight and a specific viscosity of 0.24 were mixed with octyltin mercaptide serving as a stabilizer and stearic acid serving as a lubricant, and the mixture was kneaded on a roll mill at 200° C. for 3 minutes and made into a sheet 0.5 mm in t.hickness. Several pieces of the sheets were placed in layers and pressed at 195° C. under a pressure of 100 kg/cm² for 10 minutes to prepare cut-out test pieces, which were tested for properties. Table 1 shows the results.

For Comparison Example a, CPVC only was mixed with the same stabilizer and lubricant as above without using the copolymer, and the mixture was kneaded, molded and tested similarly. A similar procedure was repeated in Comparison Example b with use of a blend of CPVC and polyvinyl chloride resin, and in Comparison Example c with use of a blend of CPVC, MBS and EVA. Table 1 also shows the results.

TABLE 1

| | Invention | Comparison Example | | |
|---|---|---|---|---|
| | Example 1 | a | b | c |
| Composition (wt. parts) | | | | |
| Copolymer A | 50 | | | |
| CPVC | 50 | 100 | 90 | 90 |
| PVC[1] | | | 10 | |
| MBS[2] | | | | 7 |
| EVA[3] | | | | 3 |
| Stabilizer[4] | 2 | 2 | 2 | 2 |
| Lubricant[5] | 2 | 2 | 2 | 2 |
| Properties | | | | |
| Vicat s.p.[6] (°C.) | 104.5 | 103.5 | 95.3 | 99.7 |
| Haze (%)[7] | 4.7 | 24.7 | 37.2 | >70 |
| Flow speed[8] (cc/sec) | 8.8 × 10$^{-3}$ | 4.8 × 10$^{-3}$ | 7.9 × 10$^{-3}$ | 5.8 × 10$^{-3}$ |

[1]Polyvinyl chloride straight polymer, 65 in K value (brand name: KANEVINYL-S1001)
[2]Methyl methacrylate-butadiene-styrene copolymer (brand name: KANEACE B12)
[3]Ethylene-vinyl acetate copolymer (brand name: EVAFLEX 250)
[4]Di-n-octyltin bisisooctylthioglycolate (brand name: TVS 8831)
[5]Stearic acid
[6]According to JIS K-7206, under load of 5 kg g
[7]According to JIS K-6714 using 2.0-mm-thick pressed sheet
[8]Flow speed as measured by a Koka flow tester at 190° C. (nozzle: 1 mm in orifice diameter, 10 mm in length, pressure: 200 kg/cm²)

Table 1 reveals that the composition of Example 1 has a higher softening point than any of the other compositions of Comparison Examples a, b and c, possesses good thermal fluidity and gives a molded product of high transparency.

EXAMPLES 2 to 4 and COMPARISON EXAMPLES d to f

The same copolymer A and CPVC as used in Example 1 were mixed together in the ratios of 70/30, 30/70 and 10/90 to prepare compositions. Table 2 shows the properties of the compositions as Examples 2, 3 and 4. Similarly compositions were prepared from the copolymer A and CPVC in the mixing ratios of 100/0, 80/20 and 2/98. Table 2 also shows the properties of these compositions as Comparison Examples d, e and f.

TABLE 2

|  | Example of invention ||| Comparison Example |||
|---|---|---|---|---|---|---|
|  | 2 | 3 | 4 | d | e | f |
| Composition (wt. parts) | | | | | | |
| Copolymer A | 70 | 30 | 10 | 100 | 80 | 2 |
| CPVC | 30 | 70 | 90 | 0 | 20 | 98 |
| Stabilizer | 2 | 2 | 2 | 2 | 2 | 2 |
| Lubricant | 2 | 2 | 2 | 2 | 2 | 2 |
| Properties | | | | | | |
| Vicat s.p. (°C.) | 104.9 | 105.5 | 104.5 | 101.5 | 103.3 | 103.5 |
| Haze (%) | 15.2 | 4.5 | 10.5 | 58.6 | 23.2 | 24.1 |

Table 2 shows that the mixing ratio between the copolymer A and CPVC should be in a desired specific range in order to obtain a molded product having a high softening point and high transparency. Stated more specifically, if the proportion of the copolymer is not lower than 80% by weight, a slightly lower softening point and decreased transparency result, whereas if it is up to 20% by weight, lower transparency also results.

EXAMPLES 5 to 9 and COMPARISON EXAMPLE g

Copolymers of different compositions were prepared with use of the same reactor as used for the copolymer A of Example 1. The copolymers were blended with CPVC in the same manner as in Example 1 to obtain compositions, which were similarly molded and tested for properties. Table 3 shows the formulations of the compositions and the measurements.

TABLE 3

|  | Example 5 | Example 6 | Example 7 | Example 8 | Example 9 | Comp. Ex. g |
|---|---|---|---|---|---|---|
| Copolymer | | | | | | |
| Methyl methacrylate (wt. %) | 95 | 80 | 90 | 90 | 90 | 60 |
| α-Methyl styrene (wt. %) | 5 | 20 |  | 5 | 10 | 40 |
| Styrene (wt. %) |  |  | 10 | 5 |  |  |
| Specific viscosity CPVC | 0.18 | 0.17 | 0.18 | 0.17 | 0.18 | 0.18 |
| Chlorine content (wt. %) | 65.3 | 65.3 | 65.3 | 65.3 | 63.4 | 65.3 |
| Specific viscosity Composition | 0.24 | 0.24 | 0.24 | 0.24 | 0.17 | 0.24 |
| Copolymer (wt. parts) | 50 | 50 | 50 | 50 | 50 | 50 |
| CPVC (wt. parts) | 50 | 50 | 50 | 50 | 50 | 50 |
| Stabilizer (wt. parts) | 2 | 2 | 2 | 2 | 2 | 2 |
| Lubricant (wt. parts) | 2 | 2 | 2 | 2 | 2 | 2 |
| Properties | | | | | | |
| Vicat s.p. (°C.) | 104.5 | 107.0 | 103.5 | 103.9 | 101.5 | 109.0 |
| Haze (%) | 7.8 | 9.2 | 4.8 | 4.7 | 6.8 | 26.6 |
| Flow speed (cc/sec) | $9.8 \times 10^{-3}$ | $7.5 \times 10^{-3}$ | $1.05 \times 10^{-2}$ | $9.9 \times 10^{-3}$ | $1.45 \times 10^{-2}$ | $4.5 \times 10^{-3}$ |

COMPARISON EXAMPLE h

Methyl methacrylate monomer was polymerized under the same conditions as in Example 1 with use of the same reactor as used for the copolymer A in Example 1 to obtain a methyl methacrylate homopolymer, which had a specific viscosity of 0.17. Fifty parts by weight of the homopolymer and 50 parts by weight of CPVC having the same chlorine content and viscosity as the one used in Example 1 were mixed with a stabilizer and a lubricant to prepare a composition. When the composition was kneaded on a roll mill at 200° C., the composition adhered to the roll surface in one minute after it was placed onto the rolls, failing to give any sheet.

The foregoing examples reveal that the composition of the present invention comprising CPVC and a copolymer of methyl methacrylate and a small amount of styrene monomer is a novel heat-resistant material having good thermal fluidity and smoothly releasable from metal surfaces for giving molded or shaped products of high transparency.

What is claimed is:

1. A highly transparent heat-resistant molding resin composition characterized in that the composition comprises 70 to 50% by weight of postchlorinated polyvinyl chloride and 30 to 50% by weight of a copolymer consisting of 97 to 75% by weight of methyl methacrylate and 3 to 25% by weight of a styrene monomer, and a stabilizing effective amount of an organic tin stabilizer.

2. A composition as defined in claim 1 wherein the copolymer has a specific viscosity ($\eta$sp. C=4 g/l, benzene, 30° C.) of 0.05 to 0.6.

3. A composition as defined in claim 2 wherein the styrene monomer component of the copolymer is α-methylstyrene and/or styrene.

4. A composition as defined in claim 1 wherein the postchlorinated polyvinyl chloride contains 60 to 69% by weight of chlorine and has a specific viscosity ($\eta$sp. C=4 g/l, nitrobenzene, 30° C.) of 0.15 to 0.35.

* * * * *